No. 824,348. PATENTED JUNE 26, 1906.
G. A. FORD.
STORAGE BATTERY.
APPLICATION FILED JULY 20, 1904.
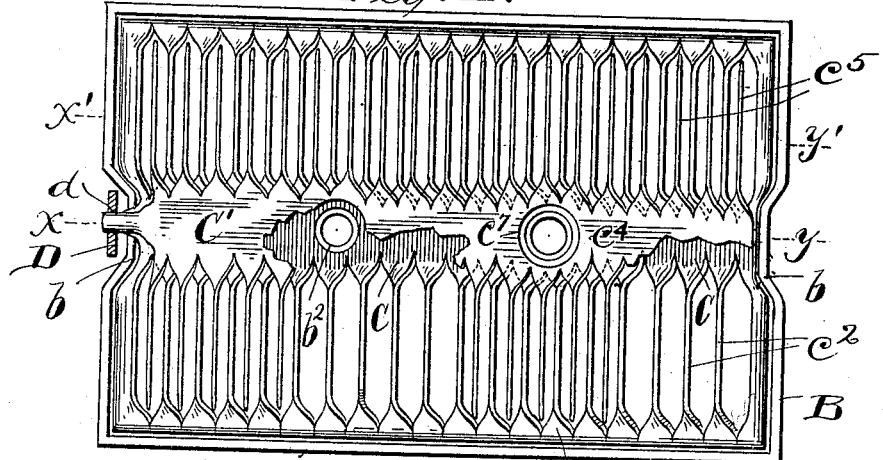
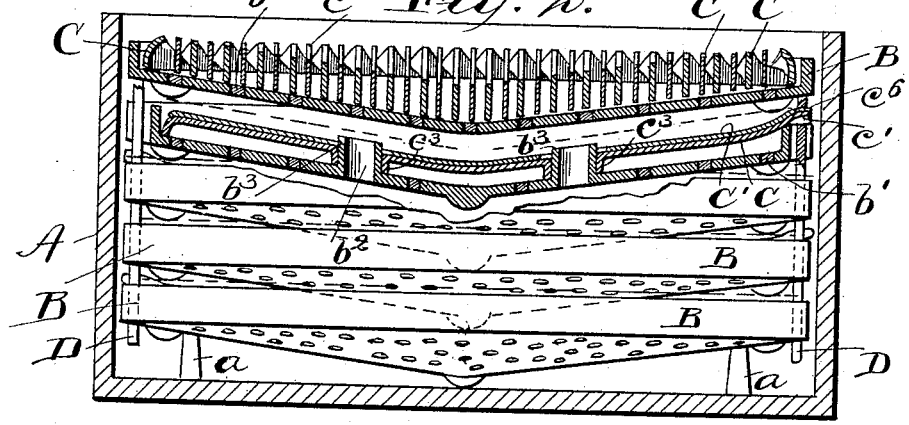
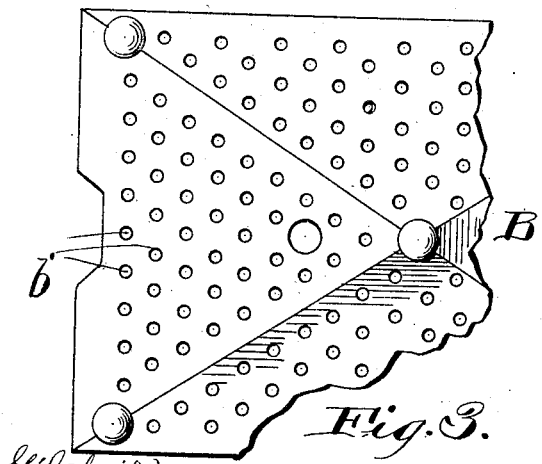
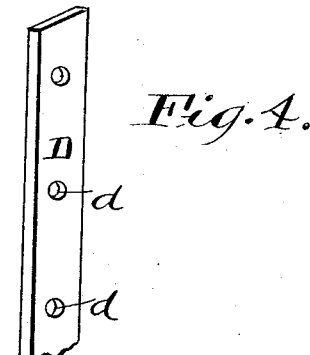
Witnesses.
E. B. Gilchrist
B. W. Brockett
Inventor:
George A. Ford,
By his Attorneys,
Thurston & Bates

UNITED STATES PATENT OFFICE.

GEORGE A. FORD, OF CLEVELAND, OHIO.

STORAGE BATTERY.

No. 824,348.  Specification of Letters Patent.  Patented June 26, 1906.

Application filed July 20, 1904. Serial No. 217,344.

*To all whom it may concern:*

Be it known that I, GEORGE A. FORD, a citizen of the United States, residing at Cleveland, in the county of Cuyahoga and State of Ohio, have invented a certain new and useful Improvement in Storage Batteries, of which the following is a full, clear, and exact description, reference being had to the accompanying drawings.

This invention relates to storage batteries of the type shown and described in my prior patent, No. 655,769, granted August 14, 1900, and more particularly to improvements upon the arrangement and construction of the pans for supporting the electrodes and also in the construction and arrangement of the plates which form these electrodes, together with other features of construction which will be more specifically brought out.

More specifically, the invention relates to the use of pans or trays having numerous perforations in the bottom thereof which are stopped or plugged with a composition of porous material, whereby the active substance in the battery is always held about its plate and is prevented from dropping down from one element to another, and, further, providing suitable openings in these plates to permit the circulation of the electrolyte through the battery at all times, and providing means in connection with these openings for preventing the escape of the active material at this point, and, lastly, the invention contemplates certain improvements in the electrodes—that is, instead of using the single plate provided with vanes which are subjected to the active material an auxiliary plate is used to supplement the ordinary plate and increase the efficiency of the cell.

The invention may be briefly summarized as consisting in the construction and combination of parts hereinafter set forth in the following description, drawings, and claims.

Referring to the drawings, Figure 1 is a top plan view of one of the trays or pans which support the electrodes, showing the electrode-plates partially in section. Fig. 2 is a central section through the jar, showing three of the plates in side elevation, one upon the line X Y of Fig. 1 and another upon the line X' Y' of Fig. 1. Fig. 3 is a bottom plan view of one of the pans or trays, and Fig. 4 is a perspective view of one of the conductor-bars leading out of the battery.

All of the parts of my improved battery may be of any form, size, and construction to meet any requirements. I have, however, shown one embodiment in the drawings which is particularly useful and effective upon automobiles and which clearly demonstrates the features of my invention. In such embodiment A represents the jar or other receptacle in which the battery is built up, and it is provided interiorly, preferably upon the bottom, with suitable supports $a$, as shown. These supports hold up the pans or trays which contain the electrodes and the active material. (Not shown.) These trays are formed substantially in the configuration shown in the drawings, with the bottom portion thereof slanting or inclining downward toward a common center and with suitable inset portions $b$ at the sides, which provide suitable means for the passage of the conductor-bars leading out of the battery. These trays are made of sufficient depth to receive the greater portion of the thickness of the electrodes and are provided in the bottom with numerous perforations stopped or otherwise plugged with a composition of any suitable porous material $b'$, such as a mixture of plaster-of-paris and meal, whereby when the electrolyte is placed in the battery the meal will be dissolved or otherwise consumed and the plaster-of-paris will be left more porous than it naturally is when it hardens without such material. I have shown these trays made preferably of gutta-percha or any suitable material, with perforations closed in the manner described, for the reason that such material is not susceptible to disintegration caused by the action of the electrolyte in the battery, whereby they will always form a rigid support for the electrodes and there will be no short-circuiting through the battery from any cause. Then, too, they prevent any loss of the active material.

Each of the pans or trays B is provided with openings $b^2$, preferably two in number, having upon the adjacent body portion of the plate a tubular member $b^3$, which extends up clear through the electrode, as will more fully hereinafter appear. These openings and tubular portions serve in insuring a complete circulation of the electrolyte through the battery at all times, thus giving such electrolyte a greater opportunity to act upon the electrodes, and thus increases the efficiency of the battery.

Within each of the pans or trays is an electrode, which consists of a plate portion C, turned down at its edges to fit within the edges of the pan and to hold it up from the bottom thereof and also having at its center a web $c$, which extends throughout the length of the plate and increases in width from one end to the other, terminating at the large end in a stem $c'$. Between this central web $c$ and both edges of the plate portion C are a series of vanes $c^2$, which are cut and twisted in a manner such that their planes lie at an angle to the plane of the plate portion C. These vanes, together with the other plate portions exposed, are acted upon by the electrolyte in the battery and direct their current to the central web and to the stem $c'$. This plate is provided adjacent to the openings $b^2$ with downwardly-projecting flanges $c^3$, which fit the tubular portions $b^3$ and support the web $c$, so that it is held away from the bottom of the pan or tray.

To increase the efficiency of the battery, I have provided what I term an "auxiliary" electrode or plate, which consists of the plate portion C', having a central web $c^4$, which conforms substantially to the length and configuration of the web portion $c$ of the plate portion C and has extending laterally from the edges thereof fins $c^5$ of suitable length to extend within the opening remaining between the vanes $c^2$ of the plate portion C, whereby the active material and the electrolyte between the vanes may be readily act upon these fins and supply current to the central web $c^4$. A stem $c^6$ is provided upon this web $c^4$, and it, together with the stem $c'$, are bent or crimped around into a solid stem which projects through an opening $d$ in a conductor-bar D. The positive plates of the battery lie with their stems extending in one direction and having suitable perforations $d$ in the positive conductor-bar, while the negative plates are alternated between the positive plates and lie with their stems extending into the negative conductor-bar at the opposite end of the battery. The plate portions C' are each provided with perforations $c^7$, which permit the passage of the tubular members $b^3$ of the pans.

The number, size, and the configuration of the pans may vary to meet any desired conditions, and the material for plugging the perforations may also be changed in its constituent parts without departing from the spirit of the invention.

Having described my invention, I claim—

1. An element for a storage battery consisting of a plate member having a series of spaced vanes, and an auxiliary plate member provided with fins projecting into the spaces between said vanes.

2. An element for a storage battery consisting of a plate member having vanes cut therefrom and twisted out of the plane thereof, and an auxiliary plate member provided with fins which project into the spaces between said vanes.

3. An element for a storage battery consisting of a plate portion having a central web tapering from the outleading end toward the opposite end, and vanes provided between said tapering web and the edges of the plate member.

4. An element for a storage battery consisting of a plate portion stamped out with a supporting edge, a central longitudinal web tapering from the outleading end to the opposite end of the plate, and spaced vanes bent from the plate portion and extending from said web to the edges of the plate.

5. An electrode member for a storage battery consisting of a comparatively long narrow central web and laterally-projecting fins free at their outer ends, said fins continuing substantially in the plane of the web except that they are turned on edge, combined with and other member having openings to receive said fins, and a disk adapted to carry said members.

6. The combination, with a storage battery element, of a supporting-pan therefor having an opening through it and a tubular member rising around such opening, the element being flanged downwardly around the tubular member whereby it is supported out of contact with the pan.

7. In a storage battery, the combination of a supporting-pan of non-conducting material, with a conductor-plate upon said pan having suitable spaced vanes, and an auxiliary conductor-plate provided with fins extending between said vanes.

8. In a storage battery, the combination of a supporting pan or tray of non-conducting material, an electrode-plate within said pan having a central web with vanes between it and the edges of said plate said vanes lying at an angle to the plane of said plate, an auxiliary electrode-plate having a web coextensive with said other web, and provided with fins extending between said vanes.

9. In a storage battery, the combination of a supporting pan or tray, of non-conducting material, an electrode-plate within said pan having a central tapering web, with vanes between it and the edges of said plate said vanes lying at an angle to the plane of said plate, and an auxiliary electrode-plate having a tapering web coextensive with said other tapering web and provided with fins extending between said vanes.

In testimony whereof I hereunto affix my signature in the presence of two witnesses

GEORGE A. FORD.

Witnesses:
CHARLOTTE SMIEDEL,
B. W. BROCKETT.